(12) United States Patent
Kuo et al.

(10) Patent No.: US 10,943,090 B2
(45) Date of Patent: Mar. 9, 2021

(54) METHOD FOR FACE SEARCHING IN IMAGES

(71) Applicant: NATIONAL APPLIED RESEARCH LABORATORIES, Hsinchu (TW)

(72) Inventors: Chia-Chen Kuo, Hsinchu (TW); Chih-Yang Lin, Taoyuan (TW); Shang-Ming Wang, Kaohsiung (TW); Wen-Jung Huang, Hsinchu (TW)

(73) Assignee: National Applied Research Laboratories, Hsinchu (TW)

( * ) Notice: Subject to any disclaimer, the term of this patent is extended or adjusted under 35 U.S.C. 154(b) by 275 days.

(21) Appl. No.: 16/108,614

(22) Filed: Aug. 22, 2018

(65) Prior Publication Data

US 2019/0065825 A1 Feb. 28, 2019

(30) Foreign Application Priority Data

Aug. 23, 2017 (TW) ................. 10612866.3

(51) Int. Cl.
*G06K 9/00* (2006.01)
*G06T 7/246* (2017.01)
*G06K 9/46* (2006.01)

(52) U.S. Cl.
CPC ..... *G06K 9/00228* (2013.01); *G06K 9/00268* (2013.01); *G06K 9/00744* (2013.01); *G06K 9/00765* (2013.01); *G06K 9/4614* (2013.01); *G06T 7/248* (2017.01); *G06T 2207/30201* (2013.01)

(58) Field of Classification Search
CPC .......... G06K 9/00228; G06K 9/00268; G06K 9/00744; G06K 9/00765; G06K 9/4614; G06T 7/248; G06T 2207/30201
See application file for complete search history.

(56) References Cited

U.S. PATENT DOCUMENTS

| | | | | |
|---|---|---|---|---|
| 7,869,631 B2* | 1/2011 | Xu | ...................... | G06K 9/00261 382/118 |
| 7,987,111 B1* | 7/2011 | Sharma | .................. | G06Q 30/02 705/7.29 |
| 8,098,885 B2* | 1/2012 | Zhang | ................ | G06K 9/00228 382/103 |
| 9,176,987 B1* | 11/2015 | Peng | .................... | G06F 16/5846 |
| 2009/0209846 A1* | 8/2009 | Bammer | ................ | A61B 5/064 600/421 |
| 2009/0249393 A1* | 10/2009 | Shelton | .............. | H04N 21/4345 725/39 |
| 2011/0276652 A1* | 11/2011 | Mukherjee | ............. | H04N 19/37 709/217 |
| 2012/0163661 A1* | 6/2012 | Lee | .................... | G06K 9/00342 382/103 |
| 2014/0208208 A1* | 7/2014 | Chevallier | ............ | G06F 16/745 715/720 |

(Continued)

*Primary Examiner* — Shefali D Goradia
(74) *Attorney, Agent, or Firm* — Rosenberg, Klein & Lee

(57) ABSTRACT

The present invention provides a method for tracking face in a video, comprising steps of taking an image sample from a video; extracting and storing a target face feature according to the image sample; dividing the video into one or more scene; and labeling one or more face matching the target face feature. Accordingly, an actor's facial expression and motion can be extracted with ease and used as training materials or subject matters for discussion.

19 Claims, 13 Drawing Sheets

(56) References Cited

U.S. PATENT DOCUMENTS

2015/0256850 A1* 9/2015 Kottke ................ H04N 19/139
                                                    375/240.16
2015/0302252 A1* 10/2015 Herrera .............. G06K 9/00281
                                                    382/117

* cited by examiner

METHOD FOR FACE SEARCHING IN IMAGES

FIELD OF THE INVENTION

The present invention relates generally to a video tracking method, and particularly to a method for tracking face in a video and hence identifying figures therein.

BACKGROUND OF THE INVENTION

The basic concept of video detection is to detect the important features and characteristics in a video. The common methods include scene change detection and scene clustering methods. The former is to detect the difference between two frames, while the latter is to analyze a whole video, cluster similar frames, and filter to give the main frames. The identification of objects in a video is always progressed. For example, many modern portable with having higher computation performance for videos, such as smartphones and tablet computers, have already included cameras and other sensors, such as microphones, capable of executing the identification in extracted contents, such as the identification of the faces, voices, or morphology. Unfortunately, under some conditions, for example, noises, varying morphology, inferior angles, bad lighting, low resolution image or low fidelity voice, the above devices normally adopt methods according to the prior art to identify faces and/or objects.

The methods of face identification according to the prior art for finding out the features of a face such as the eyes, the nose, and the lips from a face image can be roughly classified into image processing and graph matching manners. The image processing manner includes image operations such as filtering, morphological operation, or threshold operation. By using the image operations, the candidate parts for face features can be obtained. Then, the feature image parts can be picked from the candidate parts. In the graph matching manner, the human model can be used as a feature graph and the feature spots are nodes. Edges are formed by connecting lines of the nodes. Then, the relative locations between features can be labeled. For each node, the image processing manner is adopted to calculate the corresponding feature value. Then, the model is cruised over the image. By using the graph matching approach, the location of face feature can be positioned.

Nonetheless, most identification methods are focused on the identification for static images. For the identification for stream video, there are barriers in development. Currently, the development of stream image technology is more prosperous. In addition, people rely increasingly on stream images, such as documentary films, movies, dramas, random clips, and surveillance video, inducing the need for face identification. For example, in videos or dramas, when a specific segment is picked up to be a teaching material or subject matter, additional attention should be paid for tracking a specific role. In current film editing for picking up a segment of a specific role to be the subject matter or teaching material, it is still not possible to identify the same role throughout the video.

Accordingly, for overcoming the above problems, the present invention provides a method for tracking a face in a video. The method is able to identify the face of a specific role in the video and label the face image of the specific role in scenes.

SUMMARY

An object of the present invention is to provide a method for tracking a face in a video, which identifies individual faces in the video for building subject matter or teaching material.

Another object of the present invention is to provide a method for tracking face in a video, which labels the face images of a specific role in individual scenes.

Accordingly, the present invention provides a method for tracking face in a video. First, from a video comprising a plurality of image data, an image sample is taken. According to the image sample, extract and store a target face feature. Next, one or more scene, which includes a plurality of scene images, is divided from the video. When the target face feature matches a face in the plurality of scene images, label the one or more face in the plurality of scene images.

The present invention provides an embodiment. In the step of extracting and storing a target face feature according to the image sample, a Haar-like features algorithm is adopted to acquire the target face feature from the video.

The present invention provides an embodiment. In the step of labeling the one or more face in the plurality of scene images when the target face feature matches a face in the plurality of scene images, firstly, play the plurality of scene images according to the play sequence. The plurality of scene images include a first scene image and a second scene image. Next, apply a Haar-like features algorithm to the first scene image for searching the face matching the target face feature. Subsequently, track the face in the second scene image according to a continuously adaptive mean shift (CAMshift) algorithm.

The present invention provides an embodiment. In the step of labeling the one or more face in the plurality of scene images when the target face feature matches a face in the plurality of scene images, firstly, play the plurality of scene images reverse to the play sequence. The plurality of scene images include a first scene image and a second scene image. Next, apply a Haar-like features algorithm to the second scene image for searching the face matching the target face feature. Subsequently, track the face in the first scene image according to a CAMshift algorithm.

The present invention provides an embodiment. In the step of labeling the one or more face in the plurality of scene images when the target face feature matches a face in the plurality of scene images, firstly, play the plurality of scene images according to the play sequence. The plurality of scene images include a first scene image and a second scene image. Next, apply a Haar-like features algorithm to the first scene image for searching the face matching the target face feature. Subsequently, track the face in the second scene image according to a global search algorithm.

The present invention provides an embodiment. In the step of labeling the one or more face in the plurality of scene images when the target face feature matches a face in the plurality of scene images, firstly, play the plurality of scene images reverse to the play sequence. The plurality of scene images include a first scene image and a second scene image. Next, apply a Haar-like features algorithm to the second scene image for searching the face matching the target face feature. Subsequently, track the face in the first scene image according to a global search algorithm.

The present invention provides an embodiment. In the step of labeling the one or more face in the plurality of scene images when the target face feature matches a face in the plurality of scene images, firstly, play the plurality of scene images according to the play sequence. The plurality of scene images include a first scene image and a second scene image. Next, apply a Haar-like features algorithm to the first scene image for searching the face matching the target face feature. Subsequently, track the face in the second scene image according to an IBP-frame method.

The present invention provides an embodiment. In the step of labeling the one or more face in the plurality of scene images when the target face feature matches a face in the plurality of scene images, firstly, play the plurality of scene images reverse to the play sequence. The plurality of scene images include a first scene image and a second scene image. Next, apply a Haar-like features algorithm to the second scene image for searching the face matching the target face feature. Subsequently, track the face in the first scene image according to an IBP-frame method.

The present invention provides an embodiment. In the step of labeling the one or more face in the plurality of scene images when the target face feature matches a face in the plurality of scene images, firstly, play the plurality of scene images according to the play sequence. The plurality of scene images include a first scene image and a second scene image. Next, apply a Haar-like features algorithm to the first scene image for searching the face matching the target face feature. Subsequently, track the face in the second scene image according to a CAMshift algorithm. Afterwards, when the ratio of the difference in a color space value between the face and the target face feature exceeds 50%, track the face in the second scene image according to a global search method.

The present invention provides an embodiment. In the step of labeling the one or more face in the plurality of scene images when the target face feature matches a face in the plurality of scene images, firstly, play the plurality of scene images reverse to the play sequence. The plurality of scene images include a first scene image and a second scene image. Next, apply a Haar-like features algorithm to the second scene image for searching the face matching the target face feature. Subsequently, track the face in the first scene image according to a CAMshift algorithm. Afterwards, when the ratio of the difference in a color space value between the face and the target face feature exceeds 50%, track the face in the first scene image according to a global search method.

The present invention provides an embodiment. In the step of labeling the one or more face in the plurality of scene images when the target face feature matches a face in the plurality of scene images, firstly, play the plurality of scene images according to the play sequence. The plurality of scene images include a first scene image and a second scene image. Next, apply a Haar-like features algorithm to the first scene image for searching the face matching the target face feature. Subsequently, track the face in the second scene image according to a CAMshift algorithm. Afterwards, when the ratio of the difference in a color space value between the face and the target face feature exceeds 75%, track the face in the second scene image according to an IBP-frame method.

The present invention provides an embodiment. In the step of labeling the one or more face in the plurality of scene images when the target face feature matches a face in the plurality of scene images, firstly, play the plurality of scene images reverse to the play sequence. The plurality of scene images include a first scene image and a second scene image. Next, apply a Haar-like features algorithm to the second scene image for searching the face matching the target face feature. Subsequently, track the face in the first scene image according to a CAMshift algorithm. Afterwards, when the ratio of the difference in a color space value between the face and the target face feature exceeds 75%, track the face in the first scene image according to an IBP-frame method.

The present invention provides an embodiment. In the step of labeling the one or more face in the plurality of scene images when the target face feature matches a face in the plurality of scene images, firstly, play the plurality of scene images according to the play sequence. The plurality of scene images include a first scene image and a second scene image. Next, apply a Haar-like features algorithm to the first scene image for searching the face matching the target face feature. Subsequently, track the face in the second scene image according to a global search method. Afterwards, when the ratio of the difference in a color space value between the face and the target face feature exceeds 75%, track the face in the second scene image according to an IBP-frame method.

The present invention provides an embodiment. In the step of labeling the one or more face in the plurality of scene images when the target face feature matches a face in the plurality of scene images, firstly, play the plurality of scene images reverse to the play sequence. The plurality of scene images include a first scene image and a second scene image. Next, apply a Haar-like features algorithm to the second scene image for searching the face matching the target face feature. Subsequently, track the face in the first scene image according to a global search method. Afterwards, when the ratio of the difference in a color space value between the face and the target face feature exceeds 75%, track the face in the first scene image according to an IBP-frame method.

The present invention provides an embodiment for further labeling the face in the first scene image and the second scene image in the plurality of scene images.

DETAILED DESCRIPTION

In order to make the structure and characteristics as well as the effectiveness of the present invention to be further understood and recognized, the detailed description of the present invention is provided as follows along with embodiments and accompanying figures. Nonetheless, the concept of the present invention can be embodied in many different forms. The present invention is not limited to the embodiments described in the specifications. Besides, the same reference signs in figures can be used for representing similar devices.

Figure 1:
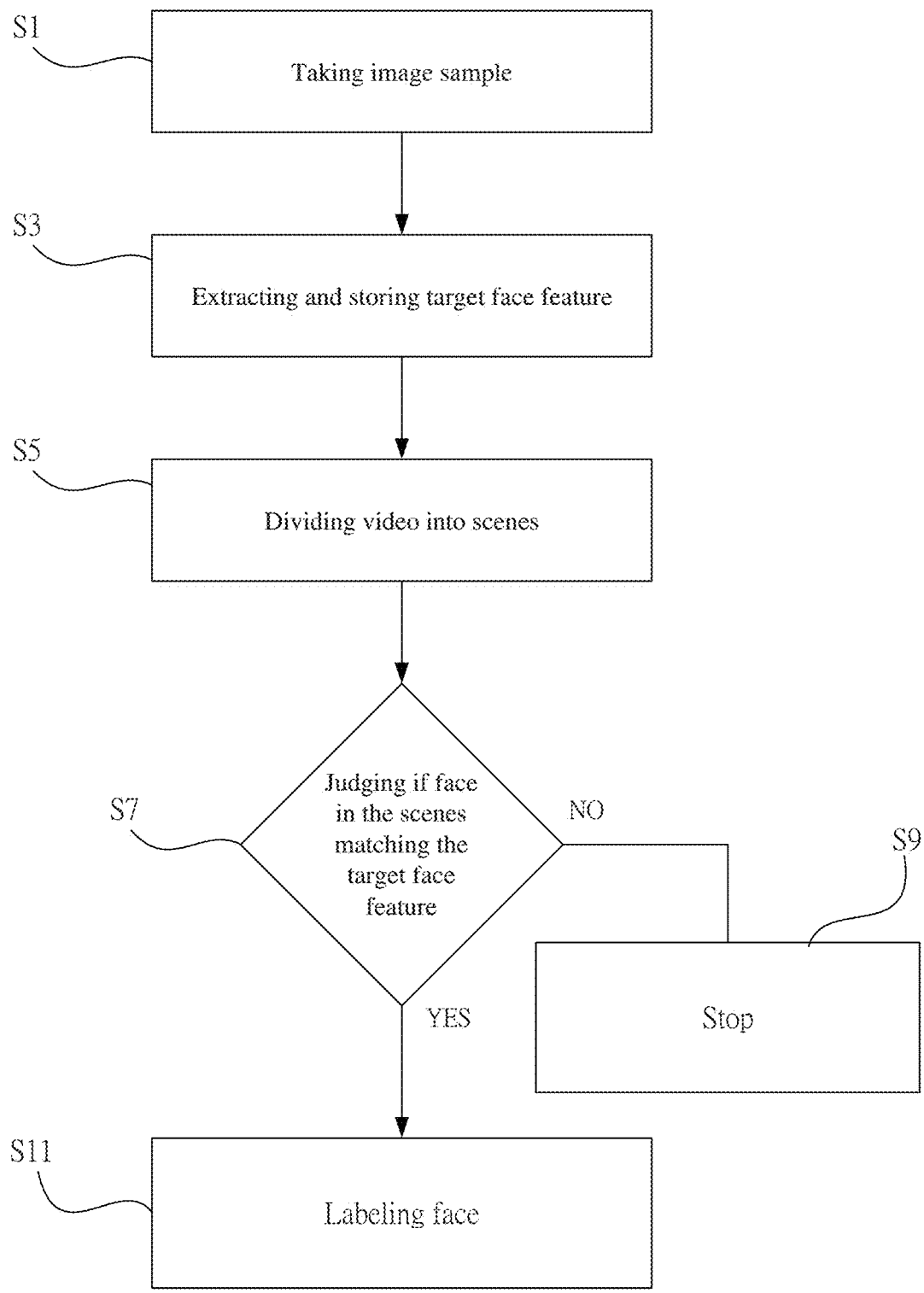
FIG. 1 shows a flowchart according to an embodiment of the present invention.

First, please refer to FIG. 1, which shows the first embodiment of the method for face tracking in a video according to the present invention. The method is executed in a host and comprising steps of:

Step S1: Taking image sample;
Step S3: Extracting and storing target face feature;
Step S5: Dividing video into scenes;
Step S7: Judging if face in the scenes matching the target face feature.

In the step S1, the host executes the method according to the present invention and reads a video. The video includes a plurality of image data. The host take an image sample from the plurality of image data. Next, in the step S3, the host extracts and stores a target face feature according to the image sample. In particular, the host can further set a robot learning procedure for extracting the target face feature according to the image sample. In the step S5, the host divides the video into one or more scene, which includes a plurality of scene images. Then, in the step S7, the host searches the plurality of image data according to the target face feature to check if there are faces matching the target face feature in the plurality of scene images. The host searches the scene video according to the search criteria set by the host for making sure if there are faces matching the target face feature in the plurality of scene video. If so, the step S11 is executed. In the step S9, if the face does not exist, the process is stopped. In the step S5, label the one or more face matching the target face feature in the plurality of scene images. In particular, in the step S11, the robot learning procedure can be executed for tracking the face corresponding to the target face feature and identifying the plurality of scene images of the stream video.

The step S11 further comprises steps of:

Step S110: Judging if blocked ratio of face exceeds 50%;
Step S112: Identifying face using Haar-like features algorithm based on target face feature;
Step S114: Identifying displacement of face using CAMshift algorithm;
Step S120: Judging if the blocked ratio of face exceeds 75%;
Step S122: Identifying face using Haar-like features algorithm based on target face feature;
Step S124: Identifying displacement of face using CAMshift algorithm;
Step S126: Identifying face using global search method;
Step S132: Identifying face using Haar-like features algorithm based on target face feature;
Step S134: Identifying displacement of face using CAMshift algorithm;
Step S136: Identifying face using IBP-frame method.

Figure 3:
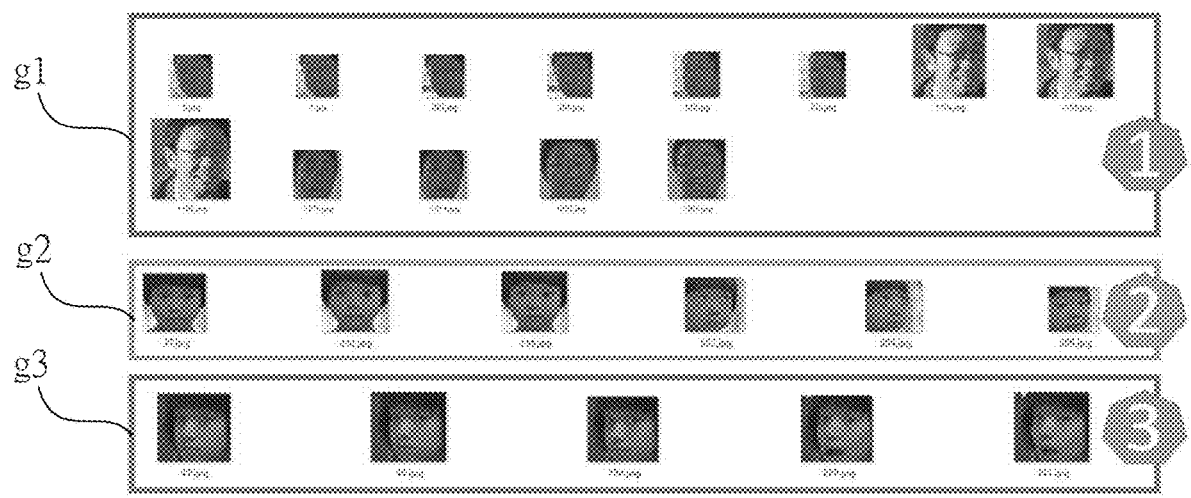
FIG. 3 shows a schematic diagram of Haar-like features according to an embodiment of the present invention.

According to the steps S110 and S120, in the step of identifying face according to the present invention, the identification method can be changed adaptively according to the blocking ratio. According to the present embodiment, the blocking ratios of 50% and 75% are taken as examples. Nonetheless, the present invention is not limited to them. The blocking ratios can be set according to users' requirements. For example, it can be set to 40% or 80%. Next, in the step S110, judge if the ratio of the blocked face in the scene image exceeds 50%. If so, the step S120 is executed. If not, the step S112 is executed. In the step S112, the host identifies face in the scene image according to a Haar-like features algorithm and the target face feature. As shown in FIG. 3, the host executes the Haar-like features algorithm for identifying face according to the target face feature, giving the first face set g1, the second face set g2, the third face set g3, and the fourth face set g4. The Haar-like features algorithm according to the present embodiment adopts the fast Haar-like features algorithm. Each element in the integration graph is the sum of all pixels on the upper left corner of the corresponding location in the original image. Thereby, a lookup table can be used to identify face features rapidly.

Figure 4:
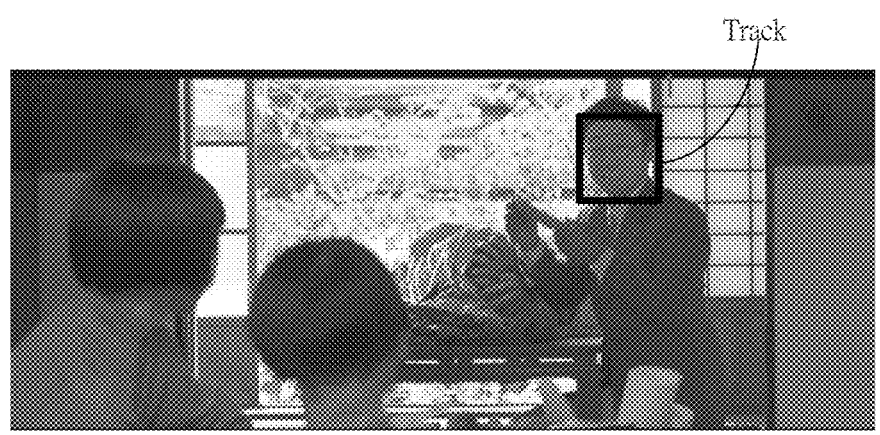
FIG. 4 shows a schematic diagram of the tracking frame according to an embodiment of the present invention.
Figure 5:
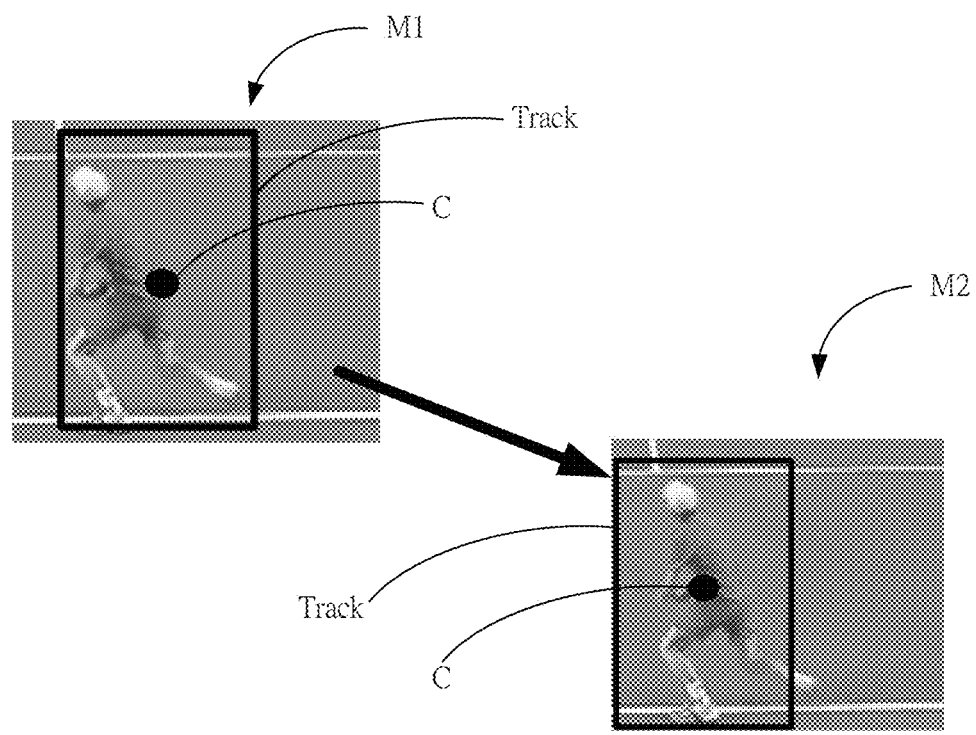
FIG. 5 shows a schematic diagram of dynamic analysis according to an embodiment of the present invention.
Figure 6:
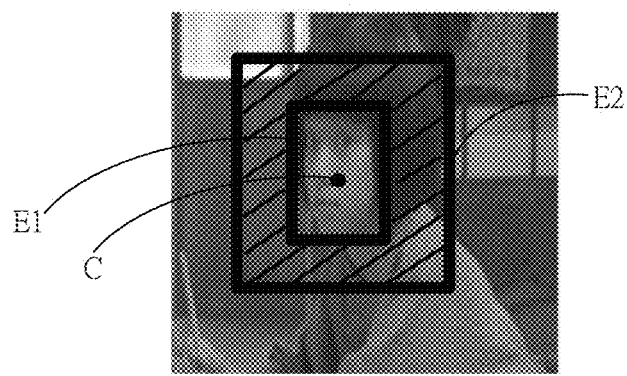
FIG. 6 shows a schematic diagram of adjusting the tracking frame according to an embodiment of the present invention.

In the step S114, the host identifies the displacement of face according to the CAMshift algorithm. The host sets a predicted center location and forms a tracking frame Track as shown in FIG. 4. Through the CAMshift algorithm, the tracking frame Track for identifying face is adjusted dynamically. As shown in FIG. 5, the first dynamic state M1 to the second dynamic state M2 is tracked. Alternatively, as shown in FIG. 6, due to the variation of the depth of field in the scene image, the scale of the image varies as well. Then the tracking frame shrinks as the image is zoomed in. According to the present embodiment, the enlargement is 1.5 times. The tracking frame is E1 before enlargement and is E2 after enlargement. Thereby, the tracking frame can cover the whole face.

Figure 7A:
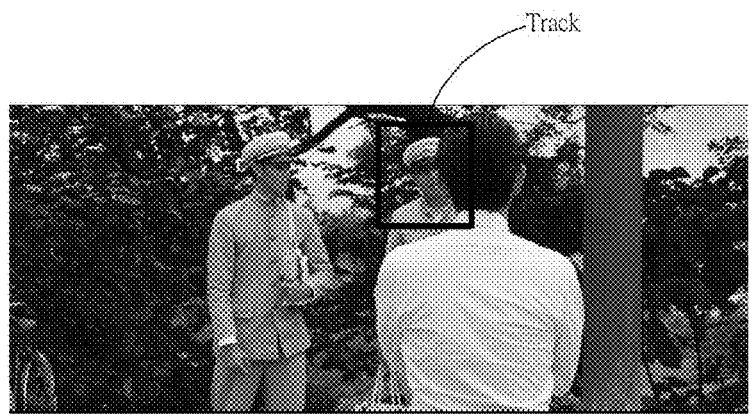
FIG. 7A shows a schematic diagram of blocked face according to an embodiment of the present invention.
Figure 7B:
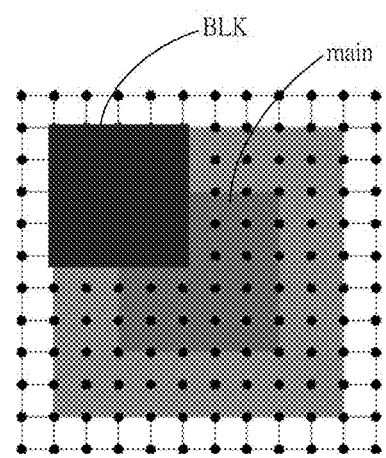
FIG. 7B shows a schematic diagram of global search according to an embodiment of the present invention.

In the step S120, when the blocking ratio on face exceeds 75%, the step S132 is executed. Otherwise, the step S122 is executed. The steps S122 to S124 are the same as the steps S112 to S114 described above. Hence, the details will not be described again. Next, in the step S126, the host performs identification according to the global search method for matching the target face feature. In addition, the host labels the faces matching the target face feature. As shown in FIG. 7A, the blocking ratio of the face to be identified in the tracking frame Track is over 50% but not exceeding 75%. Thereby, the global search method is executed. The face image in the tracking frame Track is divided into a main image main and a block image BLK. Then, each pixel in the tracking frame Track is searched to check if it matches the target face feature.

Figure 8:
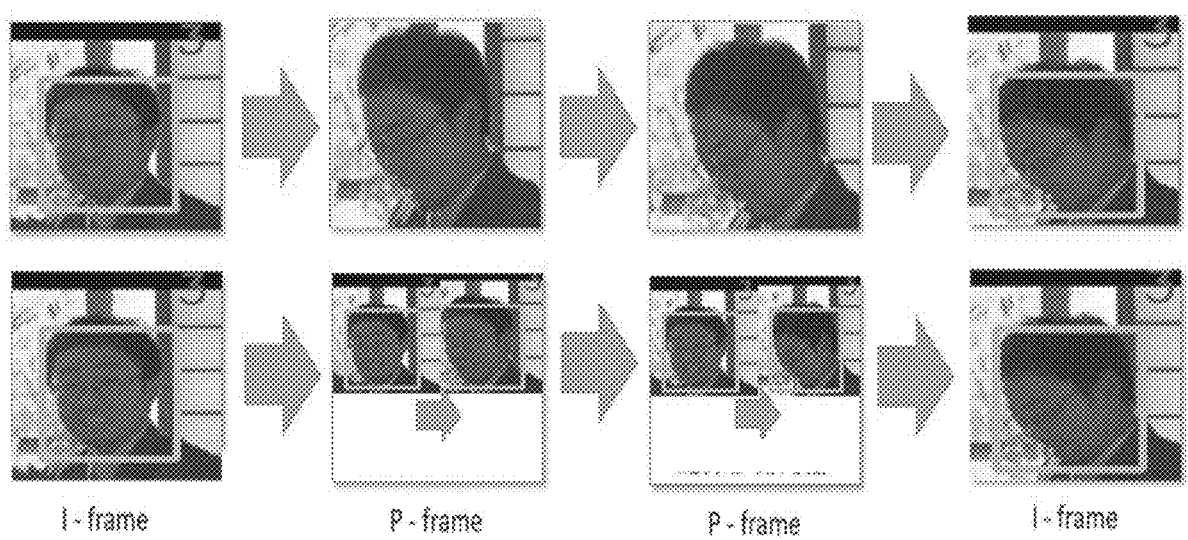
FIG. 8 shows a schematic diagram of frame analysis according to an embodiment of the present invention.
Figure 9:
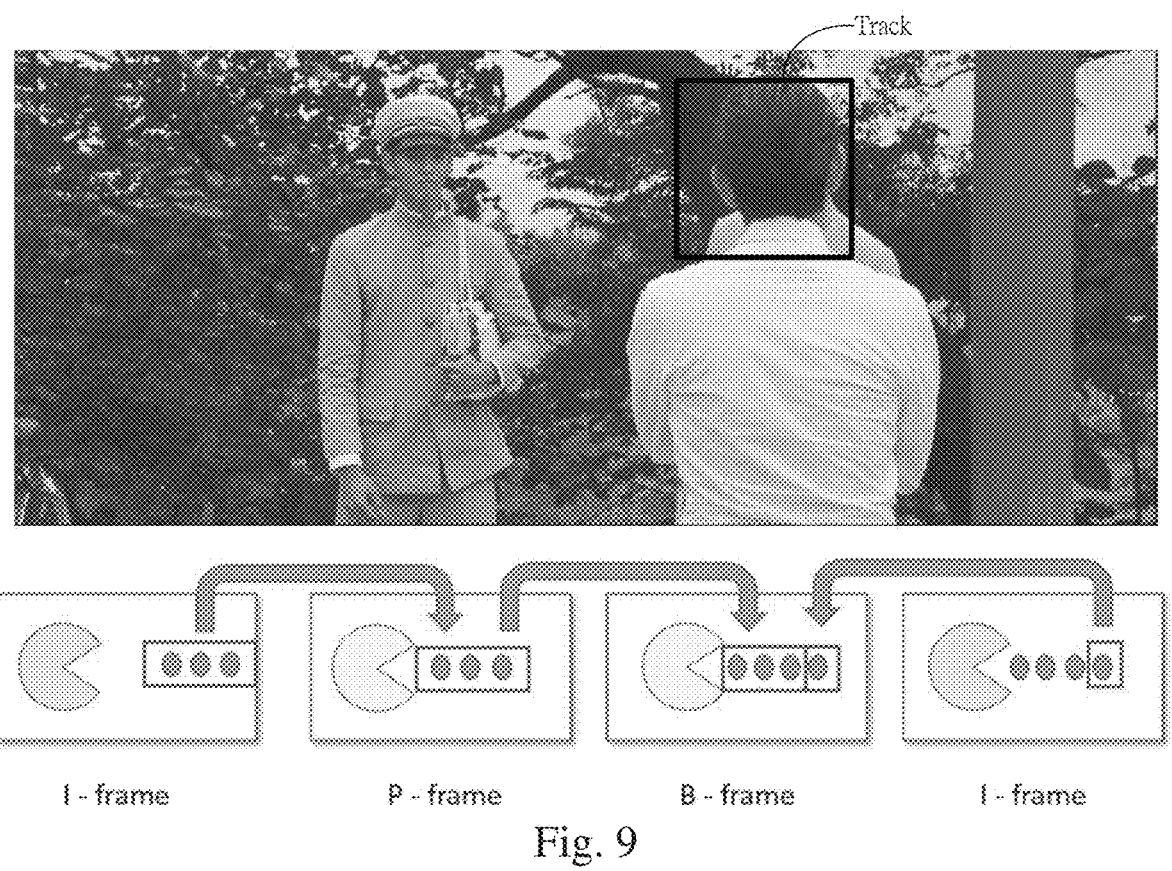
FIG. 9 shows a schematic diagram of frame analysis according to an embodiment of the present invention.

The steps S132 to S134 are the same as the steps S112 to S114 described above. Hence, the details will not be described again. Next, in the step S136, the host performs identification according to the IBP-frame method for matching the target face feature. The IBP-frame method follows the MPEG-2 format. In general, an MPEG-2 format includes multiple groups of pictures (GOP) with each GOP includes multiple frames, which normally include an I-frame, a P-frame, and a B-frame. In particular, the I-frame is an independent frame adopting intraframe coding. The P-frame adopts forward estimation while the B-frame adopts bidirectional estimation. As shown in FIGS. 8 and 9, the blocking ratio of the face identified by the tracking frame Track is less than 50%. Thereby, identification can be performed on the I-frame, the P-frame, and the B-frame.

Figure 10:
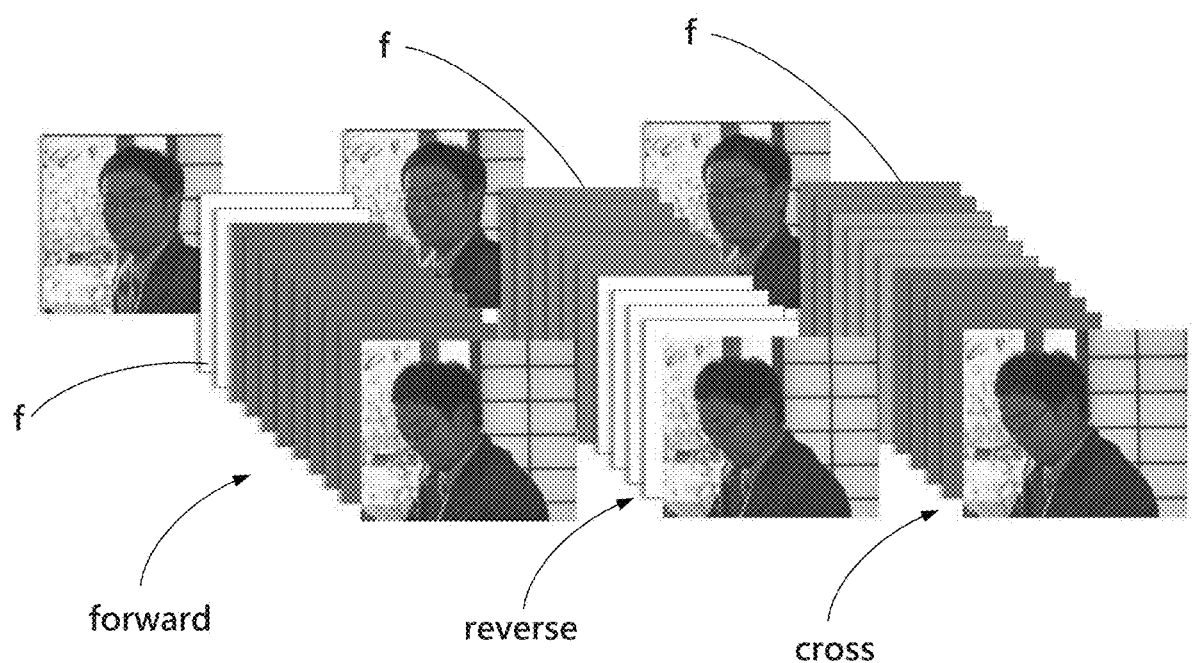
FIG. 10 shows a schematic diagram of play comparison according to another embodiment of the present invention.

Moreover, in the steps S112 to S114, S122 to S126, and S132 to S136, as shown in FIG. 10, the plurality of scene images f are played forward first. Then the plurality of scene images f are played reversely. Afterwards, the results are cross referenced.

Figure 2:
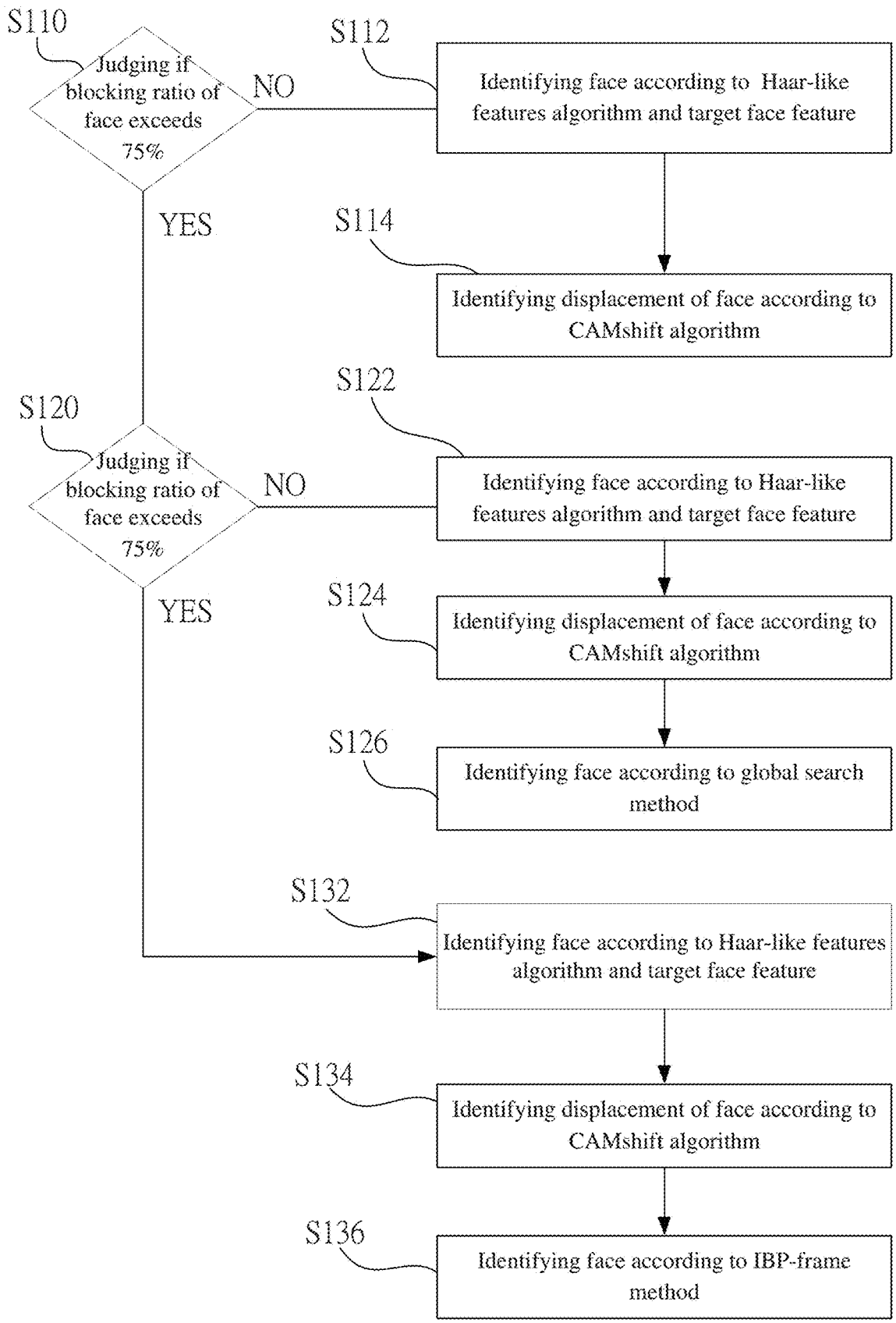
FIG. 2 shows a flowchart for the step of labeling face according to an embodiment of the present invention.
Figure 11:
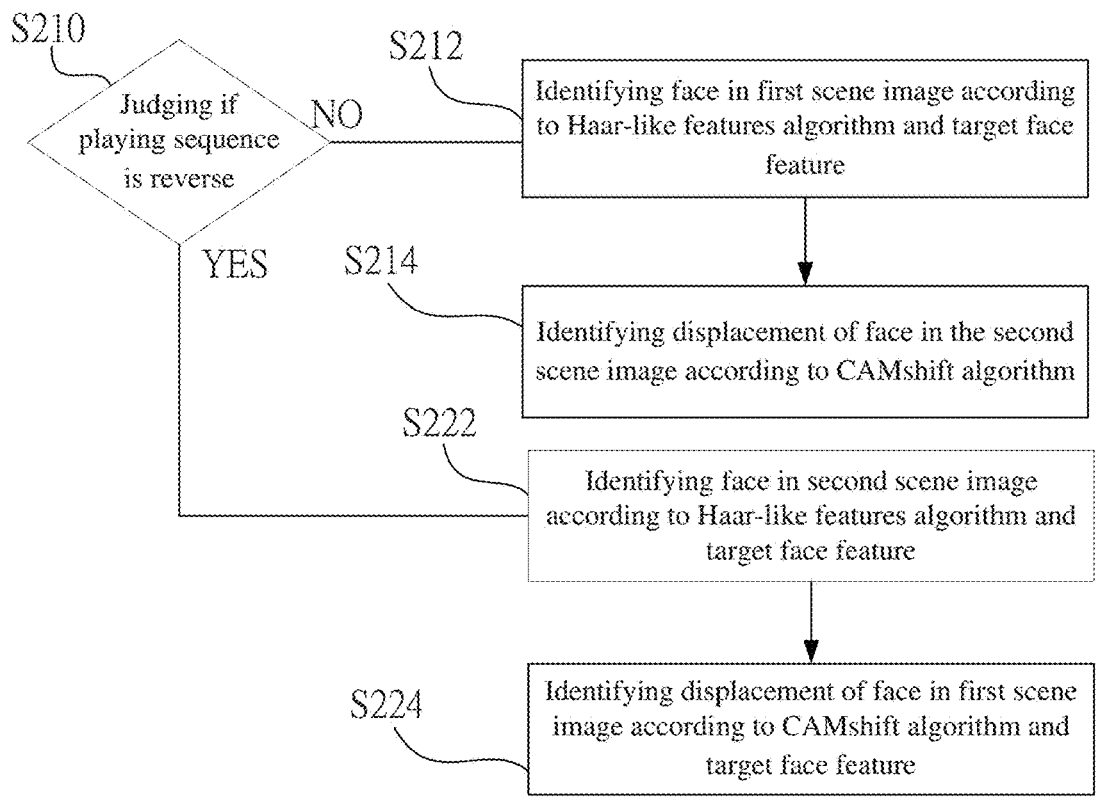
FIG. 11 shows a flowchart for the step of labeling face according to another embodiment of the present invention.

Please refer to FIG. 11, which shows a flowchart for the step of labeling face according to another embodiment of the present invention. The difference between the steps in FIG. 2 and the ones in FIG. 11 is that, in the steps in FIG. 2, the scene images are played in the normal sequence. On the contrarily, the embodiment in FIG. 11 is further divided into forward and reverse playing sequence. As shown in the figure, according to the present invention, the processing method for the scene images can be determined according to their playing sequence. The procedure comprises steps as follows:

Step S210: Judging if playing sequence is reverse;
Step S212: Identifying face in first scene image using Haar-like features algorithm based on target face feature;
Step S214: Identifying displacement of face in the second scene image using CAMshift algorithm;
Step S222: Identifying face in second scene image using Haar-like features algorithm based on target face feature; and
Step S224: Identifying displacement of face in first scene image using CAMshift algorithm based on target face feature.

In the step S210, the order of the scene images for subsequent identification is judged. As the playing sequence is not reverse, the step S212 is executed; otherwise, the step S222 is executed. According to the present embodiment, there are a plurality of scene images, including, for example, a first scene image and a second scene image. The Haar-like features algorithm and the CAMshift algorithm mentioned in the steps S212 to S224 have been described in the above embodiment. Hence, they will not be described again. In the steps S212 to S214, according to the forward playing sequence, the host performs the Haar-like features algorithm on the first scene image and then performs the CAMshift algorithm on the second scene image. On the other hand, in the steps S222 to S224, according to the reverse playing sequence, the host performs the Haar-like features algorithm on the second scene image and then performs the CAMshift algorithm on the first scene image.

Figure 12:
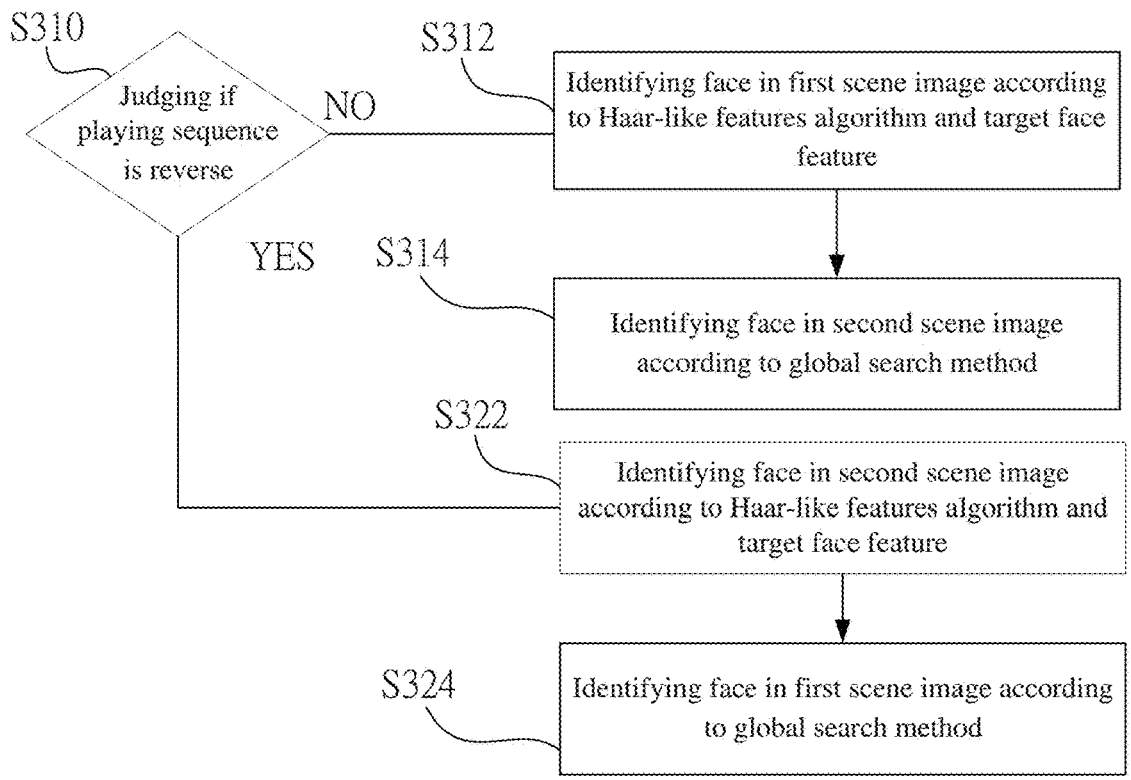
FIG. 12 shows a flowchart for the step of labeling face according to another embodiment of the present invention.

Please refer to FIG. 12, which shows a flowchart for the step of labeling face according to another embodiment of the present invention. The difference between the steps in FIG. 11 and the ones in FIG. 12 is that, according to the embodiment in FIG. 11, forward and reverse playing sequences are discriminated for performing the Haar-like feature algorithm and the CAMshift algorithm on the scene images. On the contrary, according to the embodiment in FIG. 12, the Haar-like features algorithm and the global search method are performed instead on the scene images. The steps in FIG. 12 comprises:

Step S310: Judging if playing sequence is reverse;
Step S312: Identifying face in first scene image using Haar-like features algorithm based on target face feature;
Step S314: Identifying face in second scene image using global search method;
Step S322: Identifying face in second scene image using Haar-like features algorithm based on target face feature; and
Step S324: Identifying face in first scene image using global search method.

In the step S310, the order of the scene images for subsequent identification is judged. As the playing sequence is not reverse, the step S312 is executed; otherwise, the step S322 is executed. According to the present embodiment, there are a plurality of scene images, including, for example, a first scene image and a second scene image. The Haar-like features algorithm and the global search method mentioned in the steps S312 to S324 have been described in the above embodiment. Hence, they will not be described again. In the steps S312 to S314, according to the forward playing sequence, the host performs the Haar-like features algorithm on the first scene image and then performs the global search method on the second scene image. On the other hand, in the steps S322 to S324, according to the reverse playing sequence, the host performs the Haar-like features algorithm on the second scene image and then performs the global search method on the first scene image.

Figure 13:
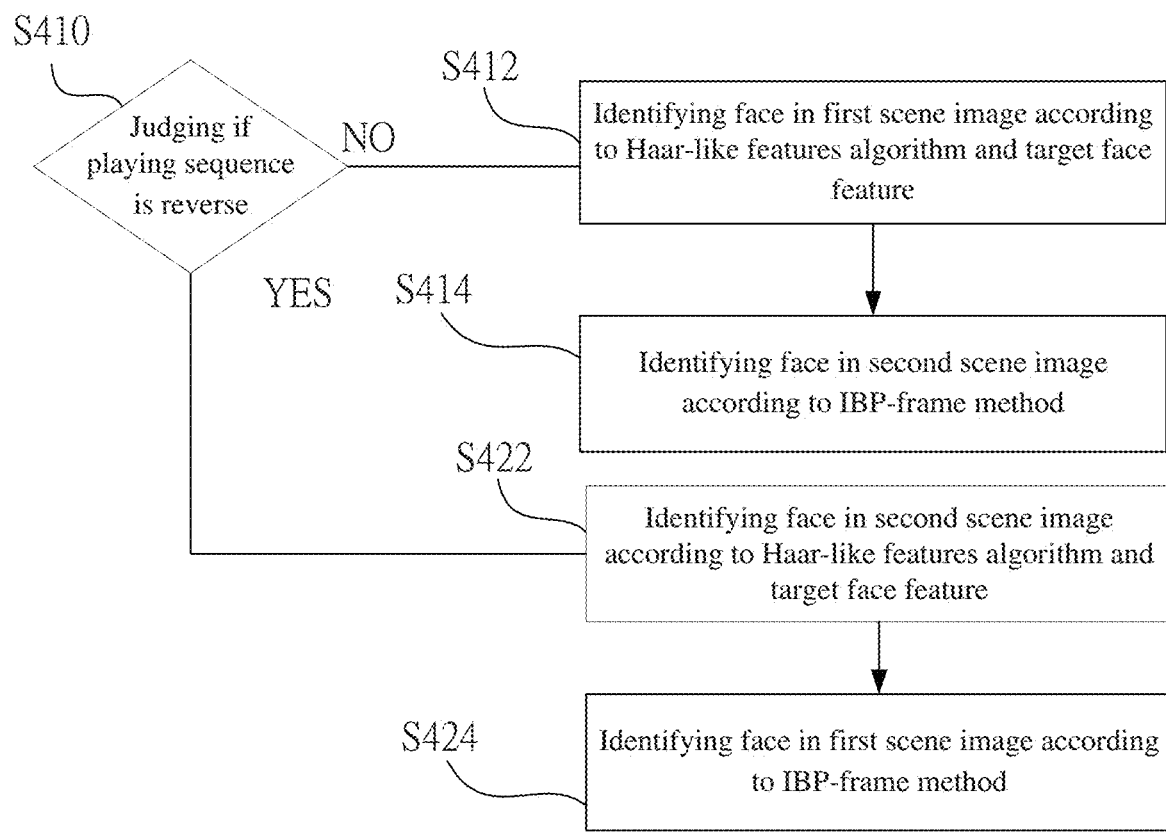
FIG. 13 shows a flowchart for the step of labeling face according to another embodiment of the present invention.

Please refer to FIG. 13, which shows a flowchart for the step of labeling face according to another embodiment of the present invention. The difference between the steps in FIG. 12 and the ones in FIG. 13 is that, according to the embodiment in FIG. 12, forward and reverse playing sequences are discriminated for performing the Haar-like feature algorithm and the global search method on the scene images. On the contrary, according to the embodiment in FIG. 13, the Haar-like features algorithm and the IBP-frame method are performed instead on the scene images. The steps in FIG. 13 comprises:

Step S410: Judging if playing sequence is reverse;
Step S412: Identifying face in first scene image using Haar-like features algorithm based on target face feature;
Step S414: Identifying face in second scene image using IBP-frame method;
Step S422: Identifying face in second scene image using Haar-like features algorithm based on target face feature; and
Step S424: Identifying face in first scene image using IBP-frame method.

In the step S410, the order of the scene images for subsequent identification is judged. As the playing sequence is not reverse, the step S412 is executed; otherwise, the step S422 is executed. According to the present embodiment, there are a plurality of scene images, including, for example, a first scene image and a second scene image. The Haar-like features algorithm and the IBP-frame method mentioned in the steps S412 to S424 have been described in the above embodiment. Hence, they will not be described again. In the steps S412 to S414, according to the forward playing sequence, the host performs the Haar-like features algorithm on the first scene image and then performs the IBP-frame method on the second scene image. On the other hand, in the steps S422 to S424, according to the reverse playing sequence, the host performs the Haar-like features algorithm on the second scene image and then performs the IBP-frame method on the first scene image.

Figure 14:
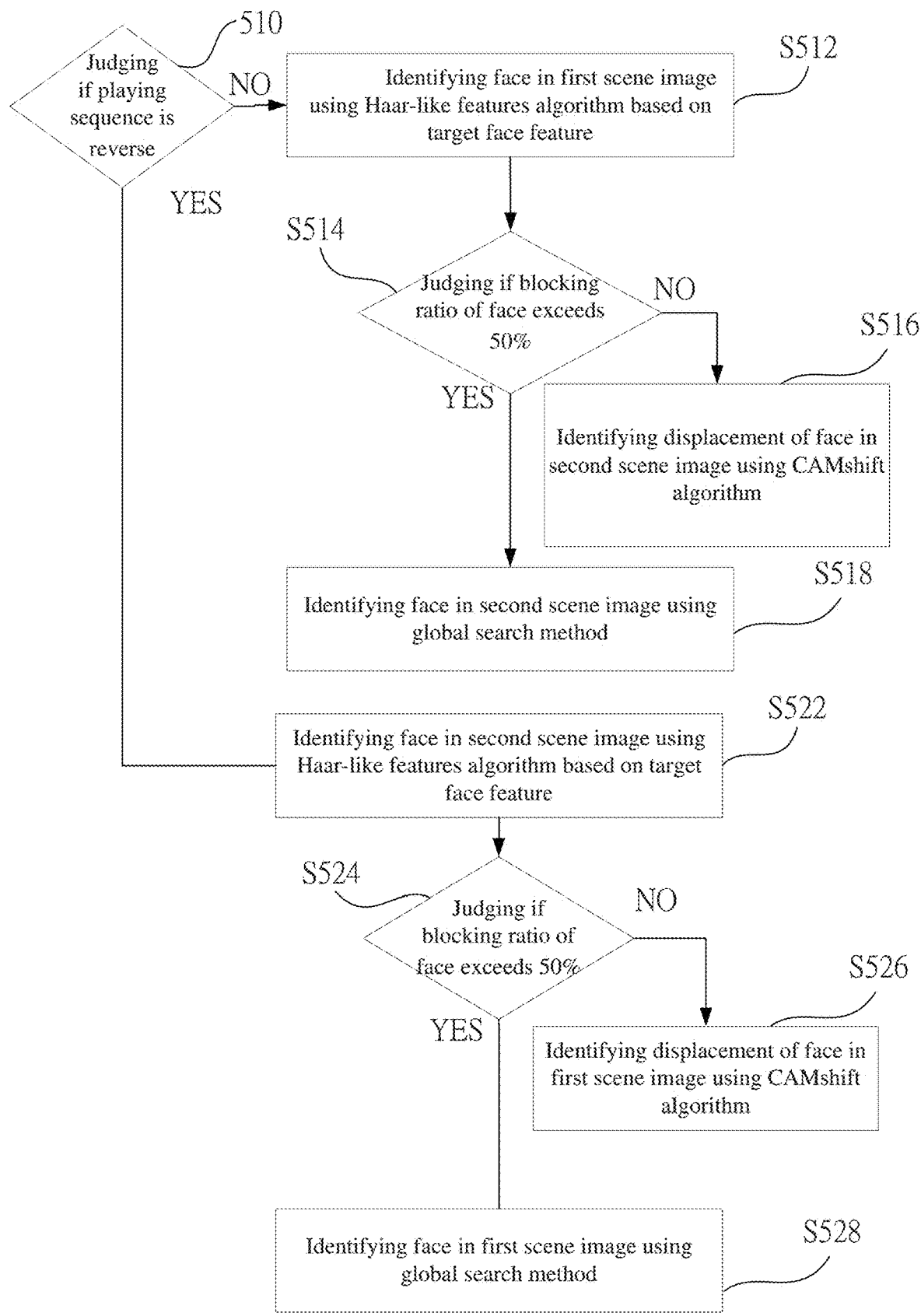
FIG. 14 shows a flowchart for the step of labeling face according to another embodiment of the present invention.

Please refer to FIG. 14, which shows a flowchart for the step of labeling face according to another embodiment of the present invention. The difference between the steps in FIG. 13 and the ones in FIG. 14 is that, according to the embodiment in FIG. 13, forward and reverse playing sequences are discriminated for performing the Haar-like feature algorithm and the IBP-frame method on the scene images. On the contrary, according to the embodiment in FIG. 14, the Haar-like features algorithm, the CAMshift algorithm, and the global search method are performed instead on the scene images. The steps in FIG. 14 comprises:

Step S510: Judging if playing sequence is reverse;

Step S512: Identifying face in first scene image using Haar-like features algorithm based on target face feature;
Step S514: Judging if blocking ratio of face exceeds 50%;
Step S516: Identifying displacement of face in second scene image using CAMshift algorithm;
Step S518: Identifying face in second scene image using global search method;
Step S522: Identifying face in second scene image using Haar-like features algorithm based on target face feature;
Step S524: Judging if blocking ratio of face exceeds 50%;
Step S526: Identifying displacement of face in first scene image using CAMshift algorithm; and
Step S528: Identifying face in first scene image using global search method.

In the step S510, the order of the scene images for subsequent identification is judged. As the playing sequence is not reverse, the step S512 is executed; otherwise, the step S522 is executed. According to the present embodiment, there are a plurality of scene images, including, for example, a first scene image and a second scene image. The Haar-like features algorithm, 50% blocking ratio, the CAMshift algorithm, and the global search method mentioned in the steps S512 to S524 have been described in the above embodiment. Hence, they will not be described again. The host executes the steps S512 to S518 according to the forward playing sequence; and the host executes the steps S522 to S528 according to the reverse playing sequence.

In the step S512, the host performs the Haar-like features algorithm on the first scene image. In the step S514, the host judges if the blocking ratio of face exceeds 50%. If not, the step S516 is executed. Otherwise, the step S518 is executed. In the step S516, the host performs the CAMshift algorithm on the second scene image. In the step S518, the host performs the global search method on the second scene image. Contrarily, in the step S522, the host performs the Haar-like features algorithm on the first scene image. In the step S524, the host judges if the blocking ratio of face exceeds 50%. If not, the step S526 is executed. Otherwise, the step S528 is executed. In the step S526, the host performs the CAMshift algorithm on the first scene image. In the step S528, the host performs the global search method on the first scene image.

Figure 15:
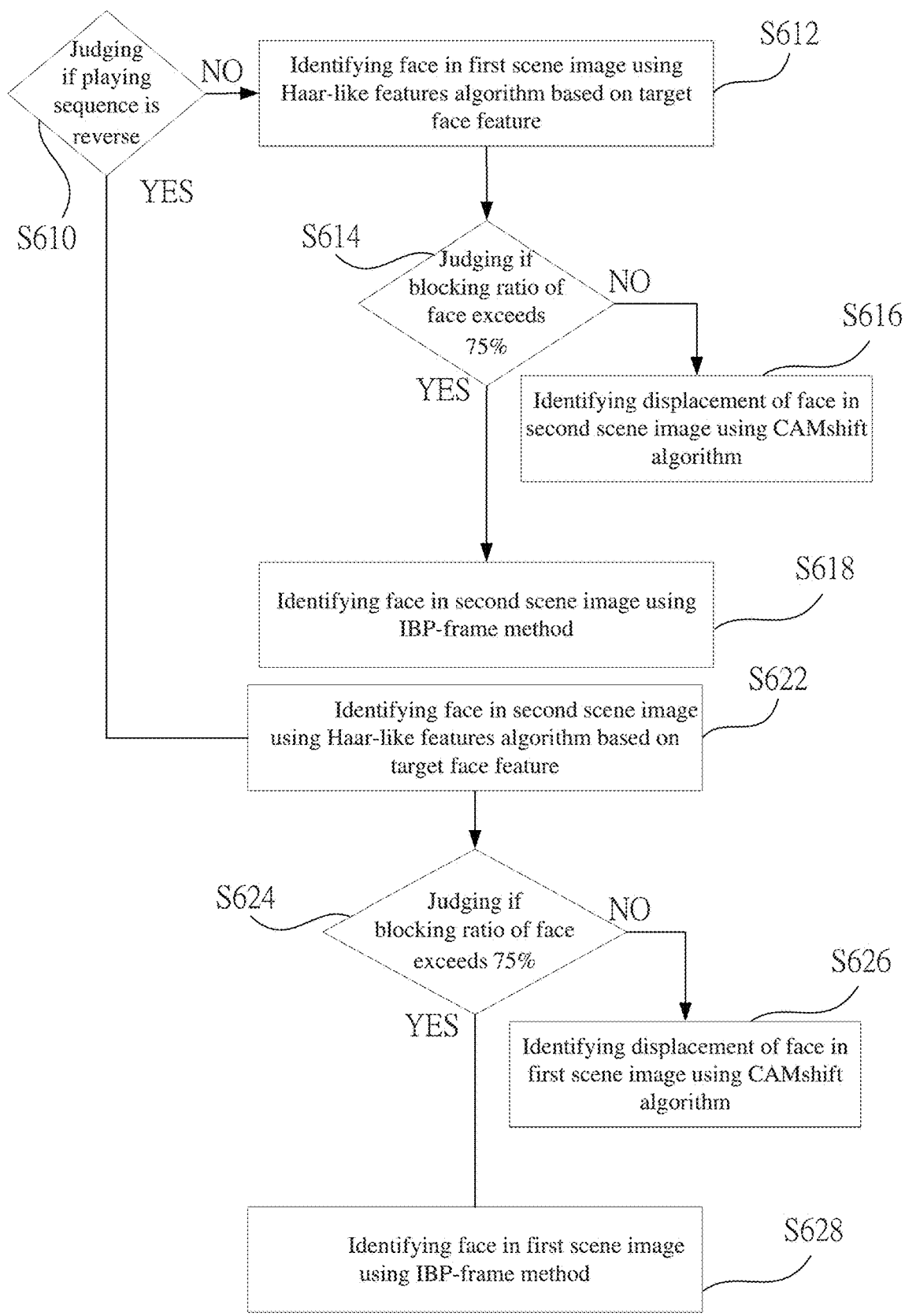
FIG. 15 shows a flowchart for the step of labeling face according to another embodiment of the present invention.

Please refer to FIG. 15, which shows a flowchart for the step of labeling face according to another embodiment of the present invention. The difference between the steps in FIG. 14 and the ones in FIG. 15 is that, according to the embodiment in FIG. 14, the Haar-like features algorithm, the CAMshift algorithm, and the global search method are performed on the scene images. On the contrary, according to the embodiment in FIG. 15, the Haar-like features algorithm, the CAMshift algorithm, and the IBP-frame method are performed instead on the scene images. The steps in FIG. 15 comprises:
Step S610: Judging if playing sequence is reverse;
Step S612: Identifying face in first scene image using Haar-like features algorithm based on target face feature;
Step S614: Judging if blocking ratio of face exceeds 75%;
Step S616: Identifying displacement of face in second scene image using CAMshift algorithm;
Step S618: Identifying face in second scene image using IBP-frame method;
Step S622: Identifying face in second scene image using Haar-like features algorithm based on target face feature;
Step S624: Judging if blocking ratio of face exceeds 75%;
Step S626: Identifying displacement of face in first scene image using CAMshift algorithm; and
Step S628: Identifying face in first scene image using IBP-frame method.

In the step S610, the order of the scene images for subsequent identification is judged. As the playing sequence is not reverse, the step S612 is executed; otherwise, the step S622 is executed. According to the present embodiment, there are a plurality of scene images, including, for example, a first scene image and a second scene image. The Haar-like features algorithm, 75% blocking ratio, the CAMshift algorithm, and the global search method mentioned in the steps S612 to S624 have been described in the above embodiment. Hence, they will not be described again. The host executes the steps S612 to S618 according to the forward playing sequence; and the host executes the steps S622 to S628 according to the reverse playing sequence.

In the step S612, the host performs the Haar-like features algorithm on the first scene image. In the step S614, the host judges if the blocking ratio of face exceeds 75%. If not, the step S616 is executed. Otherwise, the step S618 is executed. In the step S616, the host performs the CAMshift algorithm on the second scene image. In the step S618, the host performs the global search method on the second scene image. Contrarily, in the step S622, the host performs the Haar-like features algorithm on the first scene image. In the step S624, the host judges if the blocking ratio of face exceeds 75%. If not, the step S626 is executed. Otherwise, the step S628 is executed. In the step S626, the host performs the CAMshift algorithm on the first scene image. In the step S628, the host performs the global search method on the first scene image.

Figure 16:
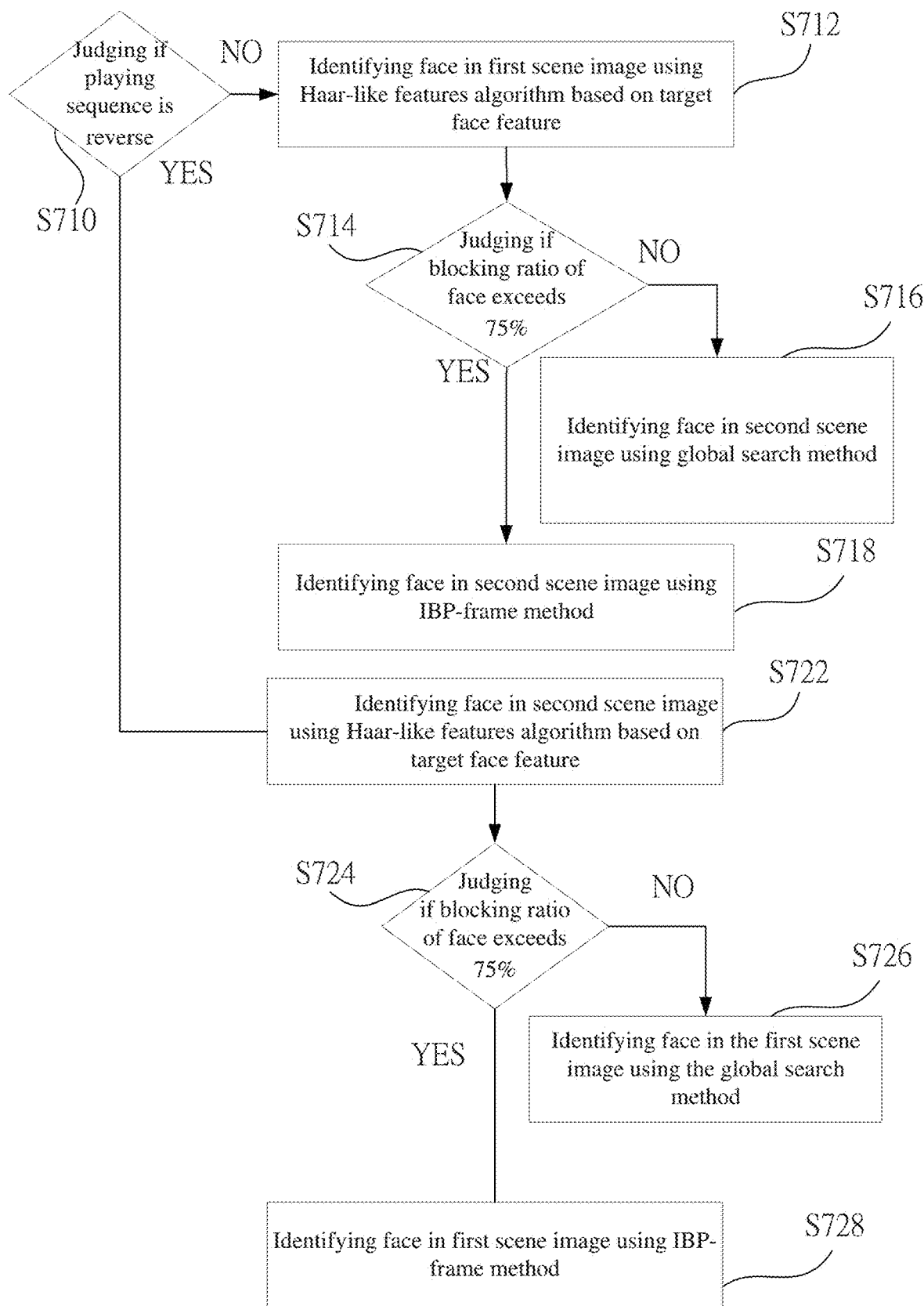
FIG. 16 shows a flowchart for the step of labeling face according to another embodiment of the present invention.

Please refer to FIG. 16, which shows a flowchart for the step of labeling face according to another embodiment of the present invention. The difference between the steps in FIG. 15 and the ones in FIG. 16 is that, according to the embodiment in FIG. 15, the Haar-like features algorithm, the CAMshift algorithm, and the IBP-frame method are performed on the scene images. On the contrary, according to the embodiment in FIG. 16, the Haar-like features algorithm, the global search method, and the IBP-frame method are performed instead on the scene images. The steps in FIG. 16 comprises:
Step S710: Judging if playing sequence is reverse;
Step S712: Identifying face in first scene image using Haar-like features algorithm based on target face feature;
Step S714: Judging if blocking ratio of face exceeds 75%;
Step S716: Identifying face in second scene image using global search method;
Step S718: Identifying face in second scene image using IBP-frame method;
Step S722: Identifying face in second scene image using Haar-like features algorithm based on target face feature;
Step S724: Judging if blocking ratio of face exceeds 75%;
Step S726: Identifying face in the first scene image using the global search method; and
Step S728: Identifying face in first scene image using IBP-frame method.

In the step S710, the order of the scene images for subsequent identification is judged. As the playing sequence is not reverse, the step S712 is executed; otherwise, the step S722 is executed. According to the present embodiment, there are a plurality of scene images, including, for example, a first scene image and a second scene image. The Haar-like features algorithm, 75% blocking ratio, the CAMshift algorithm, and the global search method mentioned in the steps S712 to S724 have been described in the above embodiment. Hence, they will not be described again. The host executes the steps S712 to S718 according to the forward playing sequence; and the host executes the steps S722 to S728 according to the reverse playing sequence.

In the step S712, the host performs the Haar-like features algorithm on the first scene image. In the step S714, the host judges if the blocking ratio of face exceeds 75%. If not, the step S716 is executed. Otherwise, the step S718 is executed. In the step S716, the host performs the CAMshift algorithm on the second scene image. In the step S718, the host performs the global search method on the second scene image. Contrarily, in the step S722, the host performs the Haar-like features algorithm on the first scene image. In the step S724, the host judges if the blocking ratio of face exceeds 75%. If not, the step S726 is executed. Otherwise, the step S728 is executed. In the step S726, the host performs the global search method on the first scene image. In the step S728, the host performs the IBP-frame method on the first scene image.

According to the above embodiments of the method for tracking a face in a video according to the present invention, an image sample can be provided for acquiring the target face feature. Next, in a plurality of scene images of one or more scene of the video, search and label a face in the plurality of scene images matching the target face feature.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A method for tracking face in a video, comprising steps of:
   taking an image sample from a plurality of image data of a video;
   extracting and storing a target face feature from said image sample;
   dividing said video into one or more scene including a plurality of scene images; and
   labeling one or more face in said plurality of scene images matching said target face feature,
   wherein said step of labeling said one or more face in said plurality of scene images matching said target face feature further comprises steps of: reading said plurality of scene images according to a playing sequence, said plurality of scene images including a first scene image and a second scene image;
   searching said face in said first scene image matching said target face feature using a Haar-like features algorithm; and
   tracking said face in said second scene image using a continuously adaptive mean shift (CAMshift) algorithm.

2. The method of claim 1, wherein said step of extracting and storing a target face feature from said image sample is performed by using a Haar-like features algorithm for acquiring said target face feature from said video.

3. The method of claim 1, wherein said step of labeling said one or more face in said plurality of scene images matching said target face feature further comprises steps of:
   reading said plurality of scene images according to a reverse playing sequence, said plurality of scene images including a first scene image and a second scene image;
   searching said face in said second scene image matching said target face feature using a Haar-like features algorithm; and
   tracking said face in said first scene image using a continuously adaptive mean shift (CAMshift) algorithm.

4. The method of claim 3, wherein said face in said first scene image and said second scene image is further labeled to said plurality of scene images.

5. The method of claim 1, wherein said step of labeling said one or more face in said plurality of scene images matching said target face feature further comprises steps of:
   reading said plurality of scene images according to a playing sequence, said plurality of scene images including a first scene image and a second scene image;
   searching said face in said first scene image matching said target face feature using a Haar-like features algorithm; and
   tracking said face in said second scene image using a global search method.

6. The method of claim 1, wherein said step of labeling said one or more face in said plurality of scene images matching said target face feature further comprises steps of:
   reading said plurality of scene images according to a reverse playing sequence, said plurality of scene images including a first scene image and a second scene image;
   searching said face in said second scene image matching said target face feature using a Haar-like features algorithm; and
   tracking said face in said first scene image using a global search method.

7. The method of claim 5 or 6, wherein said face in said first scene image and said second scene image is further labeled to said plurality of scene images.

8. The method of claim 1, wherein said step of labeling said one or more face in said plurality of scene images matching said target face feature further comprises steps of:
   reading said plurality of scene images according to a playing sequence, said plurality of scene images including a first scene image and a second scene image;
   searching said face in said first scene image matching said target face feature using a Haar-like features algorithm; and
   tracking said face in said second scene image using an IBP-frame method.

9. The method of claim 1, wherein said step of labeling said one or more face in said plurality of scene images matching said target face feature further comprises steps of:
   reading said plurality of scene images according to a reverse playing sequence, said plurality of scene images including a first scene image and a second scene image;
   searching said face in said second scene image matching said target face feature using a Haar-like features algorithm; and
   tracking said face in said first scene image using an IBP-frame method.

10. The method of claim 8 or 9, wherein said face in said first scene image and said second scene image is further labeled to said plurality of scene images.

11. The method of claim 1, wherein said step of labeling said one or more face in said plurality of scene images matching said target face feature further comprises steps of:
   reading said plurality of scene images according to a playing sequence, said plurality of scene images including a first scene image and a second scene image;

searching said face in said first scene image matching said target face feature using a Haar-like features algorithm;

tracking said face in said second scene image using a continuously adaptive mean shift (CAMshift) algorithm; and tracking said face in said second scene image using a global search method when a ratio of a difference in a color space value between said face and said target face feature exceeds 50%.

12. The method of claim 1, wherein said step of labeling said one or more face in said plurality of scene images matching said target face feature further comprises steps of:

reading said plurality of scene images according to a reverse playing sequence, said plurality of scene images including a first scene image and a second scene image;

searching said face in said second scene image matching said target face feature using a Haar-like features algorithm;

tracking said face in said first scene image using a continuously adaptive mean shift (CAMshift) algorithm; and tracking said face in said first scene image using a global search method when a ratio of a difference in a color space value between said face and said target face feature exceeds 50%.

13. The method of claim 11 or 12, wherein said face in said first scene image and said second scene image is further labeled to said plurality of scene images.

14. The method of claim 1, wherein said step of labeling said one or more face in said plurality of scene images matching said target face feature further comprises steps of:

reading said plurality of scene images according to a playing sequence, said plurality of scene images including a first scene image and a second scene image;

searching said face in said first scene image matching said target face feature using a Haar-like features algorithm;

tracking said face in said second scene image using a continuously adaptive mean shift (CAMshift) algorithm; and tracking said face in said second scene image using an IBP-frame method when a ratio of a difference in a color space value between said face and said target face feature exceeds 75%.

15. The method of claim 1, wherein said step of labeling said one or more face in said plurality of scene images matching said target face feature further comprises steps of:

reading said plurality of scene images according to a reverse playing sequence, said plurality of scene images including a first scene image and a second scene image;

searching said face in said second scene image matching said target face feature using a Haar-like features algorithm;

tracking said face in said first scene image using a continuously adaptive mean shift (CAMshift) algorithm; and tracking said face in said first scene image using an IBP-frame method when a ratio of a difference in a color space value between said face and said target face feature exceeds 75%.

16. The method of claim 14 or 15, wherein said face in said first scene image and said second scene image is further labeled to said plurality of scene images.

17. The method of claim 1, wherein said step of labeling said one or more face in said plurality of scene images matching said target face feature further comprises steps of:

reading said plurality of scene images according to a playing sequence, said plurality of scene images including a first scene image and a second scene image;

searching said face in said first scene image matching said target face feature using a Haar-like features algorithm;

tracking said face in said second scene image using a global search method; and tracking said face in said second scene image using an IBP-frame method when a ratio of a difference in a color space value between said face and said target face feature exceeds 75%.

18. The method of claim 1, wherein said step of labeling said one or more face in said plurality of scene images matching said target face feature further comprises steps of:

reading said plurality of scene images according to a reverse playing sequence, said plurality of scene images including a first scene image and a second scene image;

searching said face in said second scene image matching said target face feature using a Haar-like features algorithm;

tracking said face in said first scene image using a global search method; and tracking said face in said first scene image using an IBP-frame method when a ratio of a difference in a color space value between said face and said target face feature exceeds 75%.

19. The method of claim 17 or 18, wherein said face in said first scene image and said second scene image is further labeled to said plurality of scene images.

* * * * *